United States Patent
Sun

(10) Patent No.: US 7,374,685 B2
(45) Date of Patent: May 20, 2008

(54) PROCESS FOR SEPARATING METALLIC FROM SEMICONDUCTING SINGLE-WALLED CARBON NANOTUBES

(75) Inventor: Ya-Ping Sun, Clemson, SC (US)

(73) Assignee: Clemson University, Anderson, SC (US)

( * ) Notice: Subject to any disclaimer, the term of this patent is extended or adjusted under 35 U.S.C. 154(b) by 595 days.

(21) Appl. No.: 11/013,900

(22) Filed: Dec. 16, 2004

(65) Prior Publication Data

US 2006/0054555 A1 Mar. 16, 2006

Related U.S. Application Data

(60) Provisional application No. 60/530,796, filed on Dec. 18, 2003.

(51) Int. Cl.
*B01D 11/00* (2006.01)
(52) U.S. Cl. ............... 210/639; 209/1; 423/461; 977/751; 977/845; 436/178
(58) Field of Classification Search ........... 210/634, 210/638, 639, 702, 729, 774, 787, 806, 805; 423/447.1, 460, 445 B, 461, 447.3; 209/1; 516/32; 977/751, 842, 845, 846, 847; 436/177, 436/178; 558/87, 357
See application file for complete search history.

(56) References Cited

U.S. PATENT DOCUMENTS

| | | | |
|---|---|---|---|
| 5,227,038 A | 7/1993 | Smalley et al. | |
| 5,641,466 A | 6/1997 | Ebbesen et al. | |
| 5,698,175 A | 12/1997 | Hiura et al. | |
| 6,183,714 B1 | 2/2001 | Smalley et al. | |
| 6,422,450 B1 | 7/2002 | Zhou et al. | |
| 6,555,945 B1 | 4/2003 | Baughman et al. | |
| 6,574,130 B2 | 6/2003 | Segal et al. | |
| 6,582,876 B2 | 6/2003 | Wolk et al. | |
| 6,641,793 B2 | 11/2003 | Haddon et al. | |
| 6,723,299 B1 * | 4/2004 | Chen et al. | 423/447.1 |
| 7,008,563 B2 * | 3/2006 | Smalley et al. | 252/511 |
| 7,074,310 B2 | 7/2006 | Smalley et al. | |
| 2002/0192441 A1 | 12/2002 | Kalkan et al. | |
| 2003/0065206 A1 * | 4/2003 | Bolskar et al. | 558/87 |
| 2003/0090190 A1 | 5/2003 | Takai et al. | |
| 2003/0168385 A1 | 9/2003 | Papadimitrakopoulos | |
| 2004/0232073 A1 * | 11/2004 | Papadimitrakopoulos | 210/634 |

OTHER PUBLICATIONS

U.S. Appl. No. 60/446,393, filed on Feb. 10, 2003.*
Article—*A Route for Bulk Separation of Semiconducting from Metallic Single-Wall Carbon Nanotubes*, Debjit Chattopadhyay, Izabela Galeska, and Fotios Papadimitrakopoulos, J. Am. Chem. Soc., vol. 125, 2003, pp. 3370-3375.

(Continued)

*Primary Examiner*—Joseph W Drodge
(74) *Attorney, Agent, or Firm*—Dority & Manning, P.A.

(57) ABSTRACT

A method for separating semiconducting single-walled carbon nanotubes from metallic single-walled carbon nanotubes is disclosed. The method utilizes separation agents that preferentially associate with semiconducting nanotubes due to the electrical nature of the nanotubes. The separation agents are those that have a planar orientation, π-electrons available for association with the surface of the nanotubes, and also include a soluble portion of the molecule. Following preferential association of the separation agent with the semiconducting nanotubes, the agent/nanotubes complex is soluble and can be solubilized with the solution enriched in semiconducting nanotubes while the residual solid is enriched in metallic nanotubes.

25 Claims, 7 Drawing Sheets

OTHER PUBLICATIONS

Article—*Bulk Separative Enrichment in Metallic or Semiconducting Single-Walled Carbon Nanotubes*, Zhihong Chen, Xu Du, Mao-Hua, C. Daniel Rancken, Hai-Ping Cheng, and Andrew G. Rinzler, Nano Letters, vol. 3, No. 9, 2003, pp. 1245-1249.

Article—*Carbon nano-cages created as cubes*, Yahachi Saito and Takehisa Matsumoto, Nature, vol. 392, Mar. 19, 1998, p. 237.

Article—*DNA-assisted dispersion and separation of carbon nanotubes*, Ming Zheng, Anand Jagota, Ellen D. Semke, Bruce A. Diner, Robert S. McLean, Steve R. Lustig, Raymond E. Richardson, and Nancy G. Tassi, Nature Materials, vol. 2, May 2003, pp. 338-342.

Article—*Electronic Structure Control of Single-Walled Carbon Nanotube Functionalization*, Michael S. Strano, Christopher A. Dyke, Monica L. Usrey, Paul W. Barone, Mathew J. Allen, Hongwei Shan, Carter Kittrell, Robert H. Hauge, James M. Tour, and Richard E. Smalley, Science, vol. 301, Sep. 12, 2003, pp. 1519-1522.

Article—*Fullerene Pipes*, Jie, Liu, Andrew G. Rinzler, Hongjie Dai, Jason H. Hafner, R. Kelley Bradley, Peter J. Boul, Adrian Lu, Terry Iverson, Konstantin Shelimov, Chad B. Huffman, Fernando Rodriguez-Macias, Young-Seok Shon, T. Randell Lee, Daniel T. Colbert, and Richard E. Smalley, Science, vol. 280, May 22, 1998, pp. 1253-1256.

Article—*Fully collapsed carbon nanotubes*, Nasreen G. Chopra, Lorin X. Benedict, Vincent H. Crespi, Marvin L. Cohen, Steven G. Louie, and A. Zettl, Nature, vol. 377, Sep. 14, 1995, pp. 135-138.

Article—*Gas-phase catalytic growth of single-walled carbon nanotubes from carbon monoxide*, Pavel Nikolaev, Michael J. Bronikowski, R. Kelley Bradley, Frank Rohmund, Daniel T. Colbert, K. A. Smith, and Richard E. Smalley, Chemical Physics Letters, vol. 313, Nov. 5, 1999, pp. 91-97.

Article—*Large-scale and low-cost synthesis of single-walled carbon nanotubes by the catalytic pyrolysis of hydrocarbons*, H. M. Cheng, F. Li, G. Su, H. Y. Pan, L. L. He, X. Sun, and M. S. Dresselhaus, Applied Physics Letters, vol. 72, No. 25, Jun. 22, 1998, pp. 3282-3284.

Article—*Large-scale production of single-walled carbon nanotubes by the electric-arc technique*, C. Journet, W. K. Maser, P. Bernier, A. Loiseau, M. Lamy de la Chapelle, S. Lefrant, P. Deniard, R. Lee and J. E. Fischer, Nature, vol. 388, Aug. 21, 1997, pp. 756-758.

Article—*Large-scale purification of single-wall carbon nanotubes: process, product, and characterization*, A. G. Rinzler, J. Liu, H. Dai, P. Nikolaev, C. B. Huffman, F. J. Rodriguez-Macias, P. J. Boul, A. H. Lu, D. Heymann, D. T. Colbert, R. S. Lee, J. E. Fischer, A. M. Rao, P. C. Eklund, and R. E. Smalley, Applied Physics A, Materials Science & Processing, vol. 67, Feb. 13, 1998, pp. 29-37.

Article—*Nanotubes as nanoprobes in scanning probe microscopy*, Hongjie Dai, Jason H. Hafner, Andrew G. Rinzler, Daniel T. Colbert, and Richard E. Smalley, Nature, vol. 384, Nov. 14, 1996, pp. 147-150.

Article—*Protein-Conjugated Nanoparticles from Rapid Expansion of Supercritical Fluid Solution into Aqueous Solution*, Mohammed J. Meziani and Ya-Ping Sun, J. Am. Chem. Soc., vol. 125, 2003, pp. 8015-8018.

Article—*Separation of Metallic from Semiconducting Single-Walled Carbon Nanotubes*, Ralph Krupke, Frank Hennrich, Hilbert v. Löhneysen, and Manfred M. Kappes, Science, vol. 301, Jul. 18, 2003, pp. 344-347.

Article—*Storage of hydrogen in single-walled carbon nanotubes*, A. C. Dillon, K. M. Jones, T. A. Bekkedahl, C. H. Kiang, D. S. Bethune, and M. J. Heben, Nature, vol. 386, Mar. 27, 1997, pp. 377-379.

Article—*Structure-Based Carbon Nanotube Sorting by Sequence-Dependent DNA Assembly*, Ming Zheng, Anand Jagota, Michael S. Strano, Adelina P. Santos, Paul Barone, S. Grace Chou, Bruce A. Diner, Mildred S. Dresselhaus, Robert S. McLean, G. Bibiana Onoa, Georgii G. Samsonidze, Ellen D. Semke, Monica Usrey, and Dennis J. Walls, Science, vol. 302, Nov. 28, 2003, pp. 1545-1548.

Article—*Unraveling Nanotubes: Field Emission from an Atomic Wire*, A. G. Rinzler, J. H. Hafner, P. Nikolaev, L. Lou, S. G. Kim, D. Tománek, P. Nordlander, D. T. Colbert and R. E. Smalley, Science, vol. 269, No. 5230, Sep. 15, 1995, pp. 1550-1553.

Search Report and Written Opinion for PCT/US04/42412, Dec. 13, 2005.

* cited by examiner

PROCESS FOR SEPARATING METALLIC FROM SEMICONDUCTING SINGLE-WALLED CARBON NANOTUBES

CROSS REFERENCE TO RELATED APPLICATION

This application claims benefit to U.S. Provisional Patent Application Ser. No. 60/530,796 with a filing date of Dec. 18, 2003.

FEDERALLY SPONSORED RESEARCH AND DEVELOPMENT

The United States Government may have rights in this invention pursuant to Grant No. NCC-1-01036 between Clemson University and the National Aeronautic and Space Administration (NASA).

BACKGROUND OF THE INVENTION

Carbon nanotubes are well ordered, hollow carbon fibers composed of hexagonal groups of carbon atoms. Carbon nanotubes have been produced in both the single-walled and multi-walled forms. Single-walled nanotubes (SWNTs) are preferred in many applications, however, as they can be stronger, more conductive, and provide a higher surface area to volume ratio than their multi-walled counterparts.

Carbon nanotubes have shown appositeness in many applications, for instance as high energy density electrodes in electromechanical actuators and electrochemical batteries, as probes in scanning probe microscopy, as strengthening agents in composite materials when combined with other forms of carbon such as graphite fibers or carbon black, as catalyst supports in chemical applications, and as components in conductive ink dispersions. Other possible applications for SWNTs involve embedding the materials in semiconductor or insulator materials to obtain high interface areas for utilization in, for example, photo-voltaics, sensors, electroluminescent devices, and charge storage devices such as capacitors.

Applications of SWNTs can generally be divided into semiconducting applications and metallic applications. Unfortunately, most, if not all, formation methods provide a mixture of both metallic and semiconducting SWNTs. As such, great interest is currently being shown in the development of methods that produce only one or the other type of SWNT as well as in the development of methods to separate the two types following formation. For example, U.S. Pat. No. 6,183,714 to Smalley, et al., which is incorporated herein by reference, describes a dual laser pulse method for making ropes of SWNTs that are predominantly metallic in nature.

Other methods have attempted to synthesize one type of SWNT over the other through recognition of a difference in diameter between the two types. For example, some methods have attempted to control formation type by sufficiently controlling the catalyst particle size from which the tube grows. Particle size controls the diameter of the formed tube and hence the chirality and electronic nature of the tube. Such methods have met with limited success however, primarily due to the fact that the diametric differences between metallic and semiconductive SWNTs are so small. For instance the difference in diameter between a (10,10) metallic SWNT and a (9,11) semiconducting SWNT is only 0.03 Å.

Due to the difficulties presented in attempting to form only one type of SWNT, researchers have instead begun focusing more on methods to separate the types of SWNTs following formation. What is needed in the art is an improved method for separating metallic SWNTs from semiconducting SWNTs.

SUMMARY OF THE INVENTION

In general, the present invention is directed to methods for separating semiconducting SWNTs from metallic SWNTs. In general, the method includes providing a sample that includes both semiconducting SWNTs and metallic SWNTs and combining the sample with a separation agent.

The separation agents of the present invention are molecules that include a geometrically planar portion and one or more $\pi$ electrons on the planar portion. When the separation agent is combined with the sample, the separation agent can preferentially associate with the semiconducting SWNTs to form a complex. In addition to the characteristics described above, the separation agent can also be soluble. Thus, following formation of the complex and upon addition of a suitable solvent to the sample, a mixture can be formed including a liquid comprising the solubilized complex and solids.

The solids can be collected, such as by utilization of a centrifuge, with the collected solids being enriched in metallic SWNTs as compared to the starting sample. For instance, in one embodiment, the collected solids can be at least about 50% by weight metallic SWNTs. In another embodiment, the collected solids can be at least about 90% by weight metallic SWNTs. In one embodiment, the ratio of metallic single-walled nanotubes to semiconducting single-walled nanotubes in the solids can be at least about 1.5 times the ratio of metallic single-walled nanotubes to semiconducting single-walled nanotubes in the starting sample.

If desired, the process can be repeated using the collected solids as the starting sample in order to further enrich the solids in metallic SWNTs.

The separation agent can, in one embodiment, be a planar polybenzenoid hydrocarbon. For example, in one embodiment, the separation agent can be a porphyrin, a pyrene, or an anthracene. Optionally, the separation agent can include one or more hydrocarbon chains. For example, the separation agent can include one or more hydrocarbon chains of about 16 or more carbons in length. In one particular embodiment, the separation agent can be 5,10,15,20-tetrakis (hexadecyloxyphenyl)21H,23H-porphine (THPP).

The liquid comprising the solubilized complex can be further processed, if desired, in order to collect the semiconducting SWNTs. For example, the liquid can be collected and the association between the separation agent and the semiconducting SWNTs can be reversed, such as by washing the complex in an acid or annealing the complex at a temperature of about 500° C., at which time a solid residue can form and be collected that can comprise semiconducting SWNTs. For example the collected solid residue can comprise at least about 90% semiconducting SWNTs, in one embodiment.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying drawings in which.

DETAILED DESCRIPTION OF THE INVENTION

Figure 1:
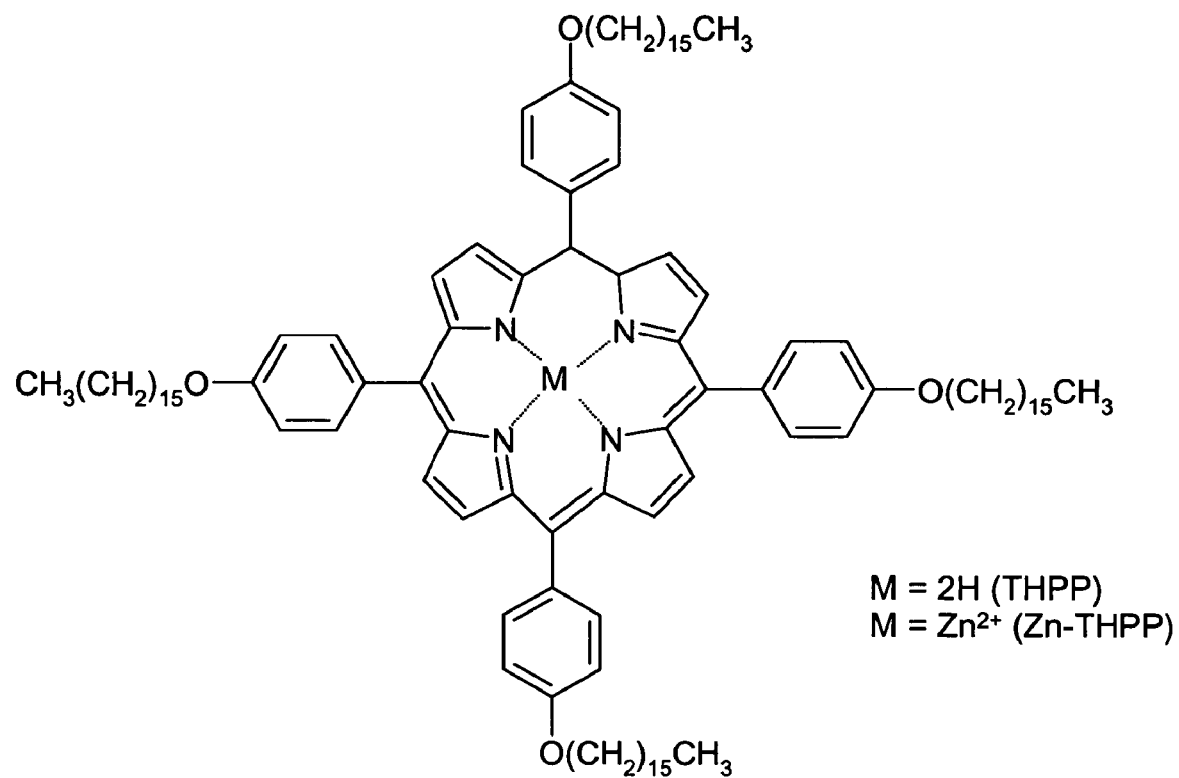
FIG. 1 is a representation of a single molecule of 5,10, 15,20-tetrakis(hexadecyloxyphenyl)21H,23H-porphine (THPP)

Reference now will be made in detail to the embodiments of the invention, one or more examples of which are set forth below. It will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention cover such modifications and variations as come within the scope of the description. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

The present invention is directed to a method for separating semiconducting SWNTs from metallic SWNTs following formation. Utilization of the disclosed process can enable formation of preparations enriched in either semiconducting or metallic SWNTs, as desired. Beneficially, the disclosed process can be scaled and utilized in a bulk separation process. In addition, the process can be carried out using inexpensive and readily available separation agents. For purposes of the present disclosure, the term 'separation agent' is herein defined to include those molecular materials that can preferentially associate with either metallic or semiconducting SWNT.

Beneficially, the disclosed processes do not require any preprocessing functionalization of the SWNTs. Moreover, the separation agents are believed to associate preferentially with one type of SWNTs due to the differences in electrical properties of the nanotubes, and are believed to be non-covalently bound to the preferred SWNTs. As such, the separation agents can be easily removed from the SWNTs following the separation protocol. Furthermore, the disclosed separation agents can be recycled and used multiple times, presenting the possibility of significant cost savings to the process.

The disclosed separation process can be utilized with any sized sample of SWNTs formed according to any known process. Common processes for forming SWNTs include for example, dual laser methods, chemical vapor deposition (CVD) methods, carbon-arc methods, and HiPco methods, all of which are generally known to those of ordinary skill in the art and any of which can be suitable for forming samples containing SWNTs and capable of separation according to the disclosed process.

For example, in one embodiment, the sample including SWNTs to be separated can be formed according to any of several known carbon-arc methods. Carbon-arc methods for nanotube preparation have been described, for instance, by C. Journet, et al., Nature 388, 756 (1997); N. G. Chopra, et al., Nature 377, 135 (1995); Y. Saito, et al., Nature 392, 237 (1998); and A. C. Dillon, et al., Nature 386, 377 (1997), all of which are incorporated herein by reference. In general, a carbon-arc method for nanotube preparation uses a DC arc discharge apparatus, an example of which has been described in U.S. Pat. No. 5,227,038 to Smalley, et al., which is also incorporated herein by reference. According to this method, carbon and a small percentage of a Group VIII transition metal are simultaneously evaporated from the anode of the arc discharge apparatus to form the nanotubes.

In another embodiment, a SWNT sample can be separated that has been formed according to a HiPco method of formation. The HiPco method described, for example, by Nikolaev, et al., (Chem. Phys. Lett. 1999, 313, 91-97) which is incorporated herein by reference, involves the high-pressure decomposition of carbon monoxide to form the nanotubes.

In one embodiment, a dual laser method such as that described in U.S. Pat. No. 6,183,724 to Smalley, et al. can be used to form SWNT preparations. Dual laser synthesis methods have also been described in the following references: J. Liu, et al., Science 280, 1253 (1998); A. G. Rinzler, et al., Applied Physics A 67, 29 (1998); A. G. Rinzler, et al., Science 269, 1550 (1995); and H. Dai, et al., Nature 384, 147 (1996), all of which are incorporated herein by reference.

In yet another embodiment, SWNTs can be separated that have been formed according to a CVD formation method. One example of a CVD method suitable for forming SWNTs is that described by Cheng et al. (Appl. Phys. Lett. 72, 3282 (1998)), which is incorporated herein by reference. The Cheng, et al. method involves the pyrolysis of a mixture of benzene with 1% to 5% thiophene or methane using ferrocene as a floating catalyst and 10% hydrogen in argon as the carrier gas. The nanotubes form in the reaction zone of a cylindrical furnace that is held at a temperature of between 1100° C. and 1200° C. Depending on the concentration of the thiophene, the nanotubes form as bundles of either single-walled or multi-walled tubes. Another useful CVD method for growing single-walled nanotubes involves using methane as precursor, ferric nitrate contained on an alumina catalyst bed, and a reaction temperature of about 1000° C.

No matter what formation method is used, when an individual SWNT forms, it will have one of three possible spatial arrangements of the atoms forming the nanotube. More specifically, a SWNT will be formed with the carbon atoms arranged in relationship to one another with an arrangement that is generally termed in the art as either an armchair, zigzag, or chiral arrangement. Whether a SWNT is metallic or semiconducting depends upon the arrangement of the carbon atoms.

Figure 2:
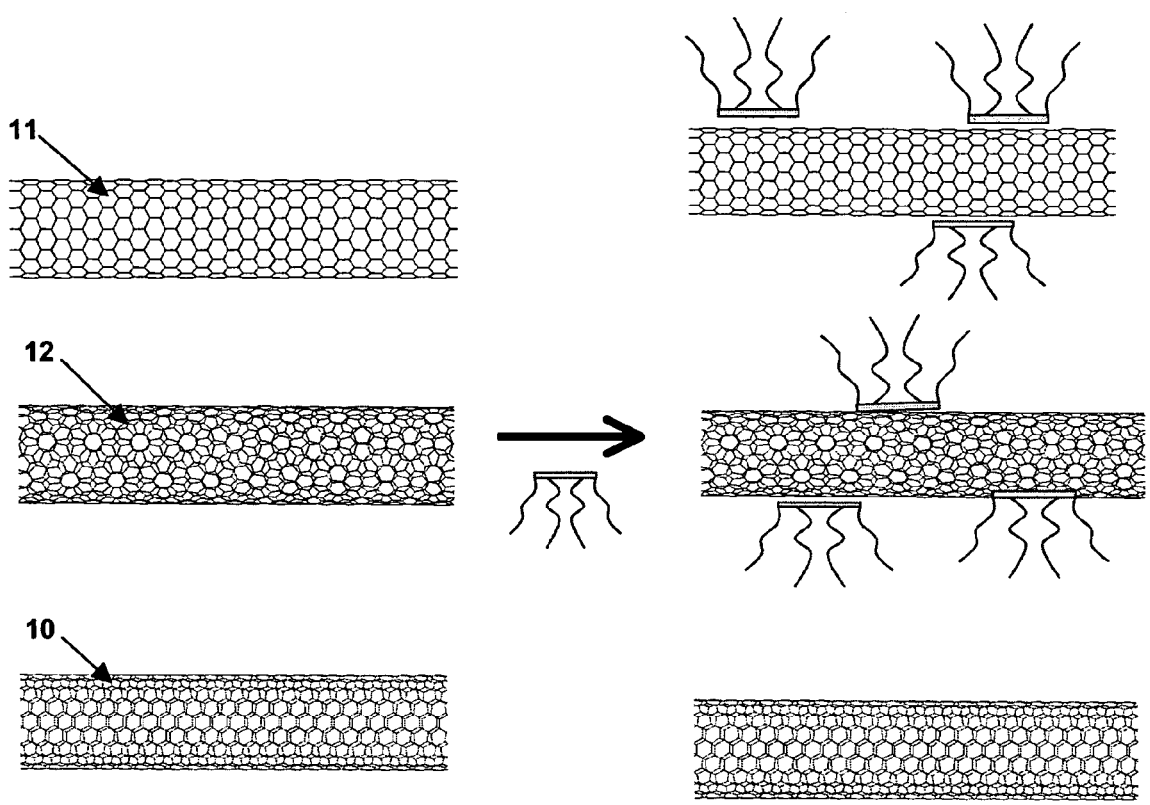
FIG. 2 is a schematic representation illustrating differences in SWNT types and the preference of THPP for semiconducting SWNTs over metallic SWNTs.

The spatial orientation of the carbon atoms forming a nanotube can be described by the chiral vector (n,m). The three general types of SWNTs are differentiated by their chiral vector. For instance, armchair nanotubes have a chiral vector (n,n) and a chiral angle of 30°. Spatially, armchair nanotubes describe a circumference consisting of para-connected hexagonal rings as illustrated in FIG. 2 at 10. Zigzag nanotubes have a chiral vector (n,0) and a chiral angle of 0°. Zigzag nanotubes describe a circumference that consists of linearly side-connected hexagonal rings. An example of a zigzag SWNT can be seen with reference to FIG. 2 at 11. Chiral nanotubes have a general chiral vector (n,m) and a chiral angle between 0° and 30°. An example of a chiral SWNT is shown in FIG. 2 at 12.

When (n−m)/3 is an integer, the nanotube exhibits metallic behavior; when (n−m)/3 is not an integer, the nanotube exhibits semiconducting behavior. As a result, armchair SWNTs are metallic, while zigzag and chiral nanotubes can be either metallic or semiconducting. When utilizing a formation process such as the carbon arc discharge method, in which the orientations of the SWNTs formed are purely random, about two-thirds of the SWNTs can be expected to be semiconducting while the other one-third can be expected to be metallic. Even in those processes such as the dual laser pulse method, that preferentially form one type of SWNT over the other, the product will generally still contain some portion of the other type, and the presence of the undesired type in the product sample can frustrate if not completely destroy the desired application of the product SWNTs.

According to the presently disclosed process, a method has been discovered for separating a sample containing a mixture of both metallic and semiconducting SWNTs into two or more portions, with each production portion being enriched in one of the two types of SWNTs. In the presently disclosed process, and while not wishing to be bound by any particular theory, it is believed to be the differences in the surface electrical characteristics between the metallic and semiconducting SWNTs that provide for the selectivity of the separation agents utilized and thus facilitate the separation processes herein disclosed.

In one embodiment of the disclosed invention, the sample including a mixture of metallic and semiconducting SWNTs to be separated can be preprocessed prior to contact with the separation agent. Preprocessing can, for example, be utilized to increase the efficiency of the disclosed process. For instance, according to many formation methods, when SWNTs are formed, the nanotubes will clump together due predominantly to attractive van der Waals forces. As such, and though not required for the presently disclosed process, in certain embodiments of the present invention, it may be beneficial to separate any clumps or ropes of SWNTs thus formed, in order to break up any large agglomerations of nanotubes and make a larger number of individual nanotubes available for quicker and more thorough association with the separation agents.

In certain SWNT formation methods, such as the HiPco formation process, for example, a metal catalyst, such as iron, can be utilized. Accordingly, a certain amount of the metal catalyst may remain in the sample to be separated according to the disclosed process. While the disclosed separation process can work well with samples including other materials, such as iron, for instance, in the mixture in addition to the SWNTs, the presence of additional materials may, depending upon the nature of the material, decrease the efficiency of the process. For instance, the separation agent could associate with the other materials in the mixture, and thus the presence of such a material could slow or prevent the formation of the preferred association between the agent and one of the two types of SWNTS. As such, in certain embodiments, the sample can be preprocessed to remove extraneous materials prior to contact with the separation agent. For example, in one embodiment, the sample can be annealed to remove materials such as residual formation metals from the sample. Other pre-separation processes can optionally be used, and in general can vary depending upon the nature of the materials to be removed from the mixture. For example, other methods can include other purification processes as are generally known in the art that can remove an undesired material without destroying the SWNTs in the sample. Methods including, for example, oxidative acid treatment, cross-flow filtration, and functionalization-defunctionalization processes can be utilized. Such methods are generally known to those of ordinary skill in the art and can vary greatly depending upon the nature of the materials to be removed from the mixture. Thus, particular methods are not described in detail herein.

The separation agents of the disclosed process are materials that have been found to associate preferentially with semiconducting SWNTs. The preferential association exhibited by the disclosed separation agents is believed to be due to a combination of the particular geometries of the agents with the orbital characteristics of the agents. More specifically, the separation agents of the present invention exhibit a planar geometry over at least a portion of the molecule. In addition, the separation agents include π-electrons in the planar portion of the molecule. Thus, the π electrons can be physically available for association with the surface of a semiconducting SWNT.

While not wishing to be bound by any particular theory, it is believed that the separation agents of the disclosed processes preferentially associate with semiconducting SWNTs due to the slight static charge that can exist on the surface of the semiconducting SWNTs. More specifically, due to the planar orientation of the molecule and the nature of the π electrons in that portion of the molecule, the π electrons can be available for interaction with an existing charge. In addition, due to the nature of semiconducting SWNTs, they can carry a slight charge on their surface. Metallic SWNTs, on the other hand, will not hold such a static charge, due to their electronic nature. Thus, the agents can be electronically attracted to the semiconducting nanotubes and moreover, following initial attraction, a weak electronic bond can form between the planar portion of the agent and the surface of the semiconducting nanotubes that can hold the agent on the surface of the semiconducting SWNTs as is schematically illustrated in FIG. 2.

In one embodiment, certain derivatives of porphyrin can be utilized as separation agents of the present invention. Porphyrin, a conjugated molecule of tetrapyrrole heterocycle, has a planar orientation in the free base form in addition to the requisite π-centers. Any soluble agent that includes both the necessary geometry and the necessary electrical characteristics can be utilized in the disclosed process. For example, some derivatives of porphyrin such as a chelate may still contain the requisite π-centers, but may not exhibit the requisite planar geometry and therefore will not be suitable as a separation agent in the disclosed process. Other possible separation agents for the inventive process can include other planar molecules containing π-centers, such as other planar polybenzenoid hydrocarbons including, for example pyrene and other arenes.

In addition to the combination of geometric and orbital characteristics that enables the agents to preferentially associate with the semiconducting SWNTs over the metallic SWNTs, the disclosed separation agents should also be soluble. For example, in certain embodiments, the separation agent of choice can be derivatized to include a long chain hydrocarbon. In one particular embodiment, a separation agent can be derivatized to include one or more hydrocarbon chains of about 16 or more carbons in length so as to promote solubility of the agent. Methods for such derivatizations are generally well known to those of ordinary skill in the art, and thus are not discussed in detail herein. In other embodiments, however, the agent may be naturally soluble, and thus a separate derivatization process need not be carried out to provide the desired solubility to the agent. The characteristic of solubility as part of the separation agent can provide for a relatively simple method for the separation of the semiconducting SWNTs from the metallic SWNTs following the preferential association of the agent with the semiconducting SWNTs, in particular as metallic SWNTs are not soluble materials.

For example, in one embodiment, porphyrin can be derivatized with one or more long chain hydrocarbons such that the porphyrin becomes soluble in any of several possible organic solvents. Suitable organic solvents can include, for example, tetrahydrofuran (THF), chloroform and any other organic solvent in which the porphyrin derivatives are soluble.

In one preferred embodiment, a porphyrin derivative including one or more long alkyl chains can be synthesized for use as a separation agent in the disclosed process. For example, p-hexadecyloxybenzaldehyde can be coupled with pyrrole to form the separation agent 5,10,15,20-tetrakis (hexadecyloxyphenyl) 21H,23H-porphine (THPP, illustrated in FIG. 1), which can then preferentially associate with semiconducting SWNTs in a mixture including both semiconducting and metallic SWNTs. Upon association, a soluble semiconducting SWNT/THPP complex can be formed that can be dissolved in any suitable organic solvent.

Following solubilization via a non-covalent solubilization process, the solution that is enriched in semiconducting SWNTs complexed with the separation agent can be separated from the insoluble metallic SWNTs by any suitable method. For example, in one embodiment, the mixture can be centrifuged and the solid material that is enriched in metallic SWNTs can be collected while the solution that is enriched in semiconducting SWNTs can be collected separately.

The solids collected from a single protocol as described above can be enriched in metallic SWNTs as compared to the starting sample. For example, in one embodiment, the starting SWNT sample can be formed by a process that produces both semiconducting and metallic SWNTs in a random fashion. Thus, when considering a purified sample, the starting sample can be expected to be about 33% metallic SWNTs and about 66% semiconducting SWNTs. In this embodiment, the solid residue obtained from a single separation protocol as described above can be at least about 50% metallic SWNTs by weight. For example, the solids can be between about 50% and about 90% by weight metallic SWNTs in one embodiment. In one embodiment, a single protocol such as that described above can provide a ratio of metallic to semiconducting SWNTs in the recovered solids that is at least about 1.5 times greater than the same ratio in the starting sample. For example, in one embodiment, following one or more protocols such as that described above, the ratio of metallic to semiconducting SWNTs can be increased by a factor of between about 2 and about 10, or even higher in some embodiments, as compared to the ratio of metallic to semiconducting SWNTs in the starting sample.

In one embodiment, if desired, the separation process can be repeated on the collected solid residue and the sample including an enriched concentration of metallic SWNT can be further enriched. In one embodiment, repetition of the process two to four times can provide a metallic-enriched SWNT sample that is at least about 90% metallic SWNTs by weight.

According to one embodiment of the invention, the liquid sample including the semiconducting nanotubes complexed with the separation agent can be further processed, if desired, for instance to reverse the association and recover the pure semiconducting SWNTs. Beneficially, as the association between the separation agents and the semiconducting SWNTs is not believed to be covalent in nature, any of a number of relatively simple separation processes as are generally known in the art can be utilized to reverse the association and render the semiconducting SWNTs insoluble again, at which point they can be collected as a solid residue. For example, in one embodiment, following separation from the solids enriched in metallic SWNTs, the solvent can be evaporated, and the separation agent can be removed from the SWNTs with an acid wash, for example an acetic acid wash. This mixture can then be centrifuged and the solid residue, enriched in semiconducting SWNTs, can be collected.

In another embodiment, the separation agent can be removed from the semiconducting SWNTs by refluxing, for example in toluene or THF solution or, optionally, by thermal annealing at about 500° C. In any case, following reversal of the association, the semiconducting SWNTs will become insoluble, and the solid residue including the semiconducting SWNTs can then be collected.

If desired, the solid material enriched in semiconducting SWNTs can be further enriched by repetition of the separation process, similar to the further enrichment of the metallic SWNT sample described above. In general, repetition of the separation process two to four times can provide a SWNT sample enriched in semiconducting nanotubes comprising at least about 90% semiconducting SWNTs.

As an additional benefit to the disclosed process, the separation agent can be recovered following reversal of the association with the semiconducting SWNTs and utilized multiple times. Thus, the disclosed separation process can be simple, economical, and can provide a method to obtain both enriched metallic SWNT samples and enriched semiconducting SWNT samples in both small-scale and large-scale systems.

Reference will now be made to exemplary embodiments of the invention. Each example is provided by way of explanation of the invention, not as a limitation of the invention.

EXAMPLE 1

SWNT samples were produced by use of an arc-discharge method as is generally known in the art. Samples were purified via oxidative acid treatment according to established procedure. A separation agent, 5,10,15,20-Tetrakis (hexadecyloxyphenyl)-21H,23H-porphine (THPP, shown in FIG. 1 where M=2H) was synthesized by coupling p-hexadecyloxybenzaldehyde with pyrrole in glacial acetic acid, followed by column chromatography separation and structural characterizations.

A purified SWNT sample (100 milligrams) was added to a 20-milliliter solution of THPP in chloroform (10 mg/mL), and the mixture was sonicated (Fisher Scientific FS20, 70 W, 42 kHz) for 48 hours. The chloroform was then removed on a rotary evaporator, and the solid mixture was extracted repeatedly with hexanes, coupled with vigorous centrifuging (about 3,100 g) for 20 minutes, to remove any free, unassociated THPP. Following the extraction process, 10 milliliters of tetrahydrofuran (THF) was added to the solid sample to dissolve the THPP/semiconducting SWNT complex. This mixture was then vigorously centrifuged for 10 minutes, and the solid residue was collected. The procedure was then repeated a second time with the collected solid residue. Following the second procedure a third repeat was attempted, but no further solubilization was observed. A total of 39 mg of solid residue containing SWNTs that did not associate with THPP was combined from the runs (denoted as "free-SWNT" sample).

The solutions obtained from the first two repeated experiments, containing the THPP/semiconducting SWNT complex, were combined, and the solvent THF was evaporated. The removal of THPP from the combined soluble sample was accomplished via washing the sample with acetic acid coupled with vigorous centrifuging, resulting in the recovery of the now insoluble SWNTs (denoted as "recovered-SWNT" sample). To ensure a rigorous comparison between the free-SWNT and recovered-SWNT samples in subsequent spectroscopy and conductivity characterizations, both solid-state samples were thermally treated under the same experimental condition of 800° C. for 14 hours in a nitrogen atmosphere.

Figure 3:
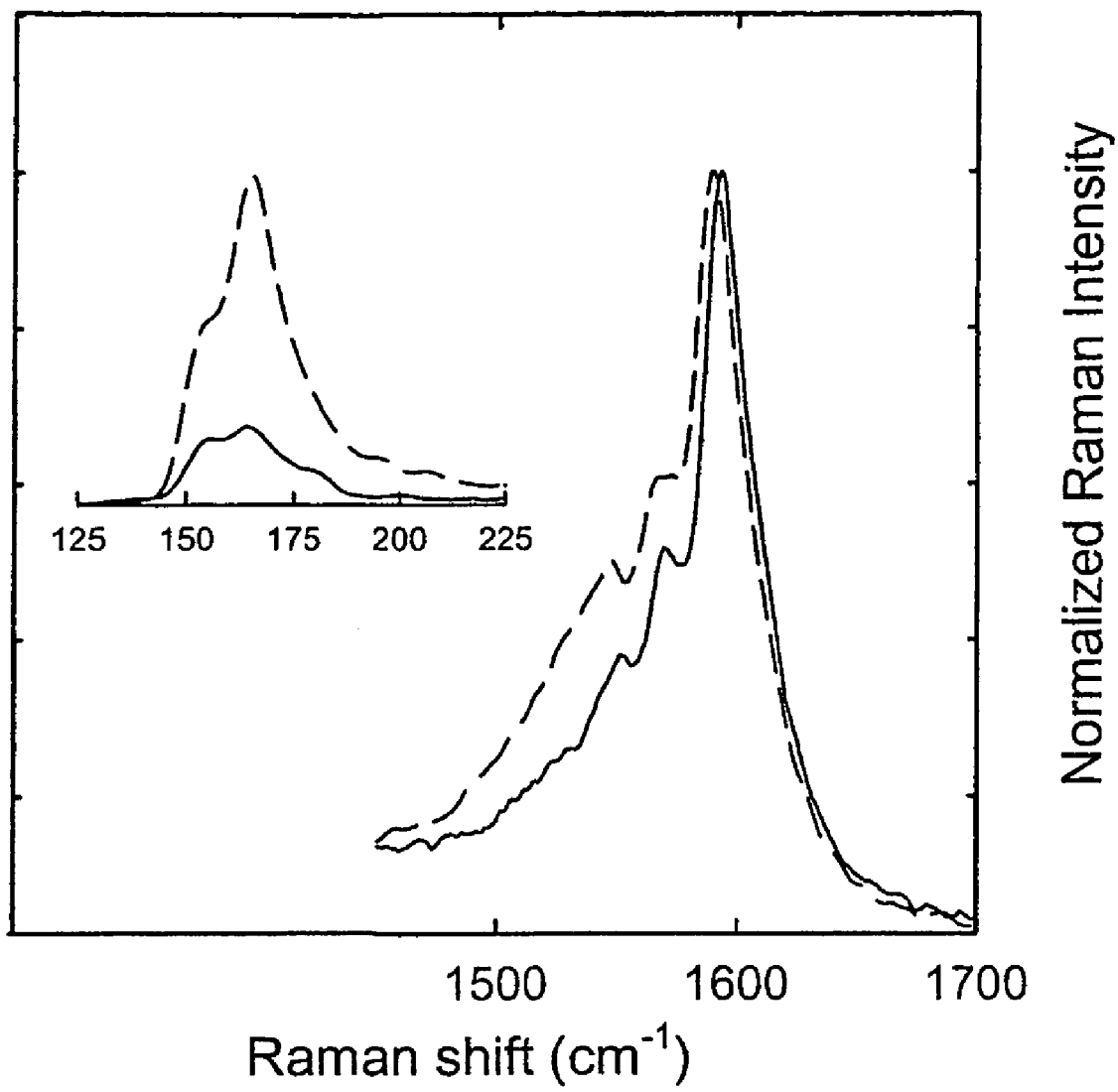
FIG. 3 compares tangential mode G-bands of separated portions of a SWNT sample following separation according to one embodiment of the presently disclosed process.

FIG. 3 illustrates Raman spectra obtained with 785 nm (1.58 eV) excitation for the samples. The recovered-SWNT portion spectra is shown by the solid line in the Figure, and the free-SWNT portion spectra is shown by the broken line. As can be seen in the Figure, the G-band of the free-SWNT sample is more unsymmetrical and broader than that of the recovered-SWNT sample, indicative of substantial enrichment in metallic SWNTs in the free-SWNT sample (Breit-Wigner-Fano lineshape). The Raman features in the radial breathing mode region (shown in the inset of FIG. 3) are also consistent with an enrichment of metallic SWNTs in the free-SWNT sample.

Figure 4:
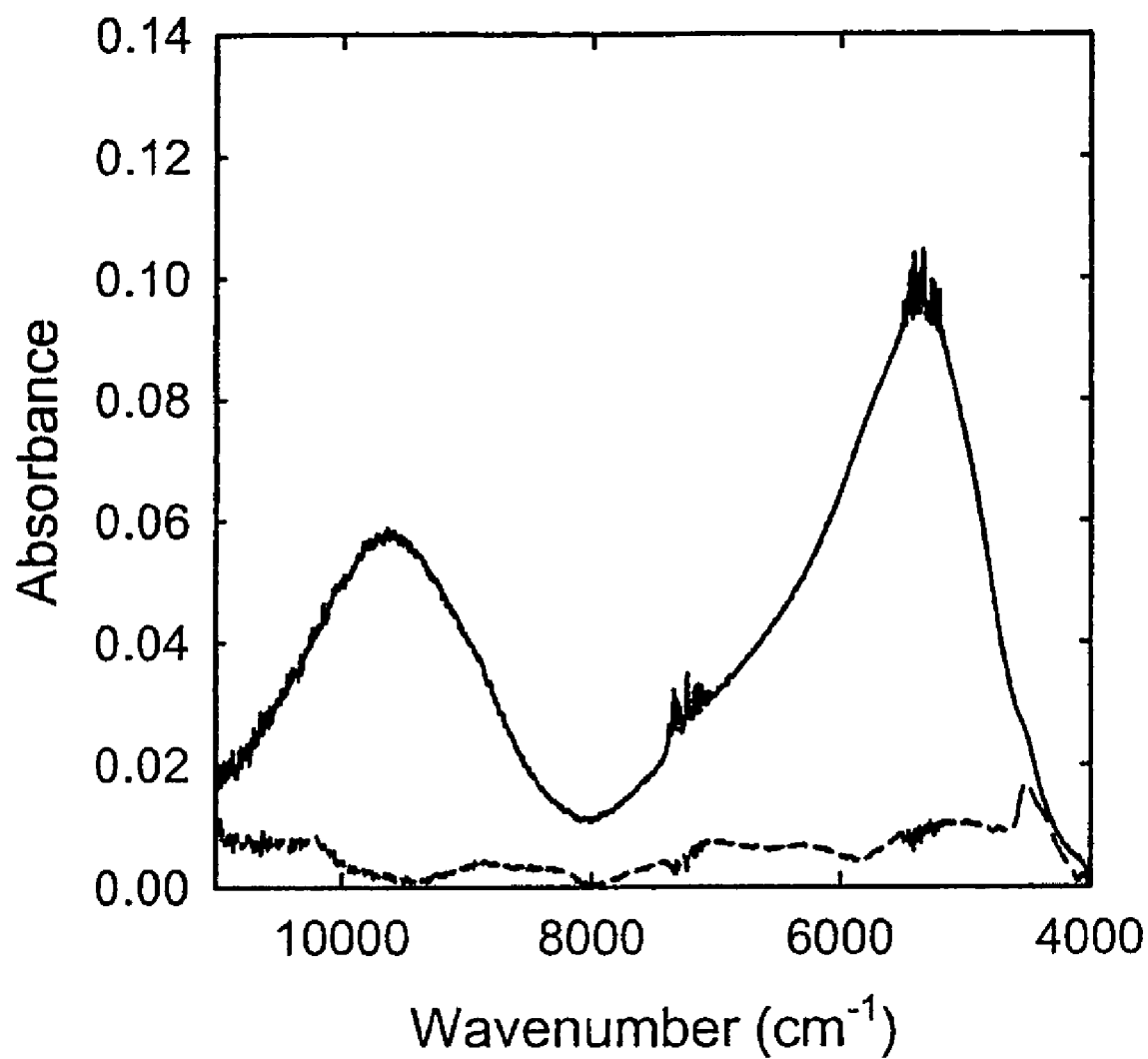
FIG. 4 compares the near-IR absorption spectra of separated portions of a SWNT sample following separation according to one embodiment of the presently disclosed process.

The significant separation of semiconducting nanotubes (in recovered-SWNT samples) from metallic nanotubes (in free-SWNT samples) is made more evident by a quantitative comparison of the near-IR absorption spectra. The spectra shown in FIG. 4 were obtained by measuring (Thermo-Nicolet Nexus 670) thermally treated solid-state samples of the same quantity under the same experimental conditions. No surfactant or other dispersion agents were used in the preparation of the specimens for measurements to avoid the possibility of any doping effects. As can be seen in reference to FIG. 4, for the semiconducting recovered-SWNT sample (solid line), the near-IR absorption spectrum contains significant bands at ~5,390 cm$^{-1}$ (1,855 nm, 0.67 eV) and ~9,710 cm$^{-1}$ (1,030 nm, 1.19 eV), corresponding to transitions associated with the first ($S_{11}$) and second ($S_{22}$) pairs, respectively, of van Hove singularities in the electronic density of states for semiconducting SWNTs. Additionally, the absorption of the metallic free-SWNT sample (broken line) is negligible over the near-IR region. The results suggest that most of the semiconducting SWNTs in the starting sample ended up in the recovered-SWNT sample, and that the porphyrin interactions were selective toward semiconducting SWNTs.

The bulk electrical conductivities of the free-SWNT and recovered-SWNT samples (thermally treated under the same condition, as described above) are very different. In a comparative conductivity evaluation, the two samples were pressed separately into pellets with dimensions of approximately 9 mm×3 mm×1 mm. Results from the classical four-probe conductivity measurements under ambient conditions show that the bulk conductivities of the two samples differ by more than two-orders of magnitude, 1.1 S/cm for the metallic free-SWNTs vs. 0.007 S/cm for the semiconducting recovered-SWNTs.

Figure 5:
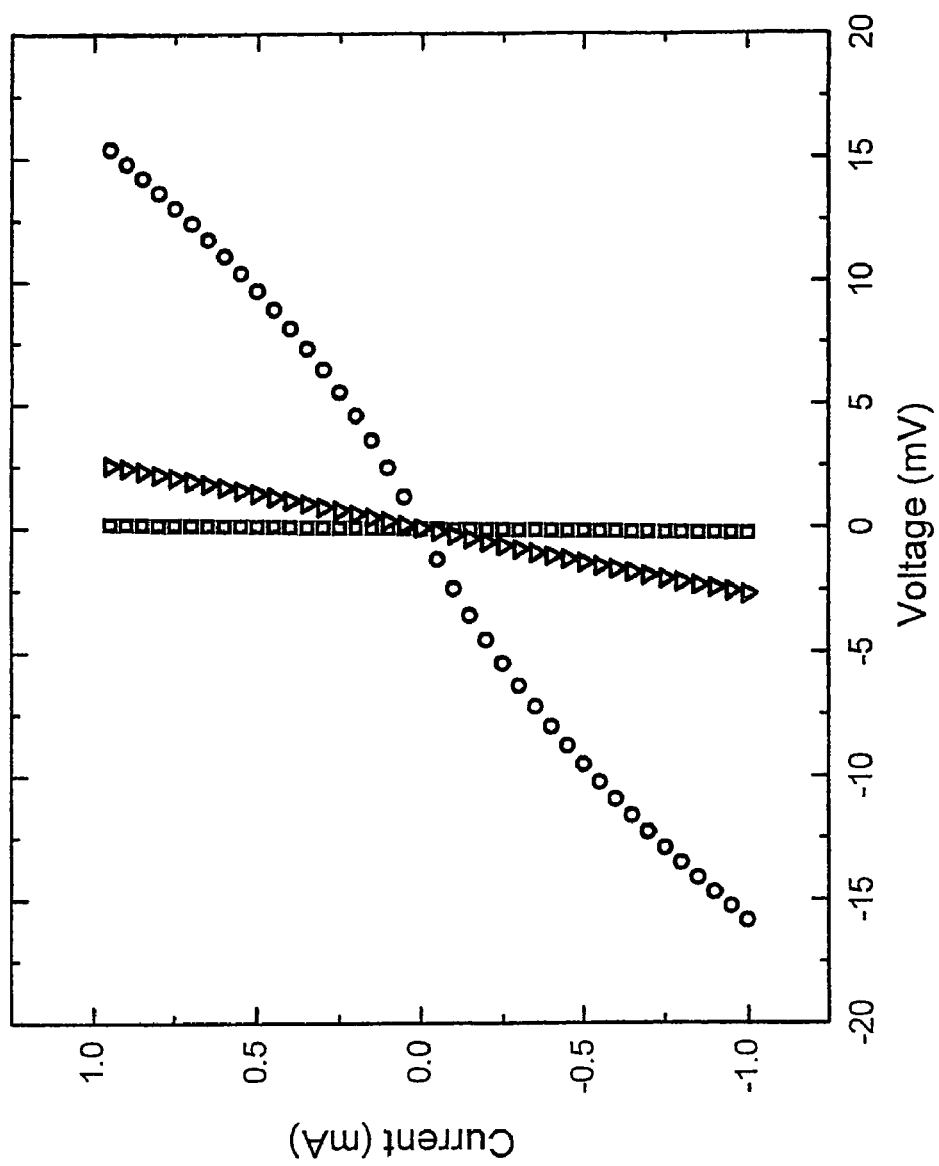
FIG. 5 compares the electrical conductivity of a SWNT sample prior to separation and the two separated portions of SWNTs obtained following separation according to one embodiment of the disclosed process.

FIG. 5 illustrates the results obtained from the electrical conductivity measurements including measurements of the starting SWNT sample (inverse triangle), the semiconducting recovered-SWNT sample (circle), and the metallic free-SWNT sample (square). Conductivity measurements were performed on a Keithley 2400 multimeter at 1~10 mA range to minimize current overheating.

Figure 6:
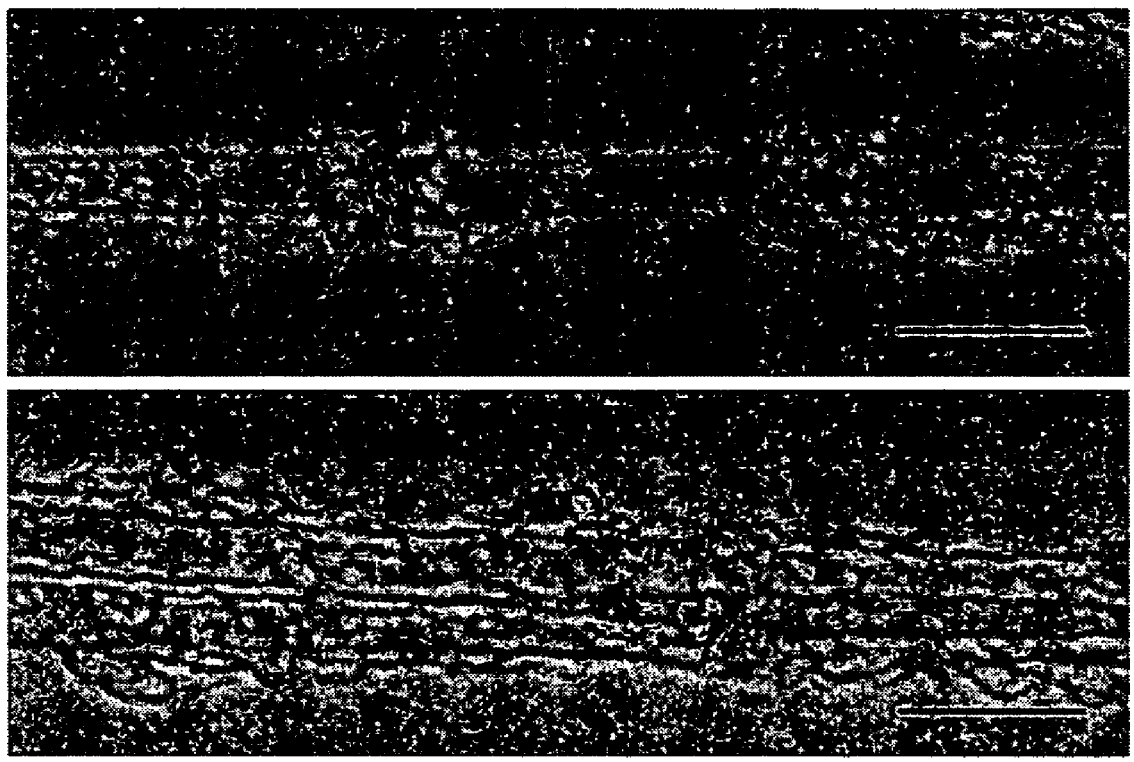
FIG. 6 shows high resolution TEM images of SWNTs in the soluble portion of a separated SWNT sample.

In order to examine the effects on the nanotubes due to the THPP species association on the surface, the soluble THPP/SWNT sample was characterized in solution by $^1$H NMR (data not shown). The NMR signals of THPP are significantly broadened upon the attachment to SWNTs, which is likely due largely to the significantly reduced mobility of the THPP species. Consistent with the NMR results, the porphyrin ring appears to be bound to the SWNT surface, leaving long alkyl chains free in solution. Such a picture is supported by the high-resolution TEM results, which show soft materials on the surfaces of individual nanotubes (FIG. 6, scale bars=5 nm).

EXAMPLE 2

Figure 7:
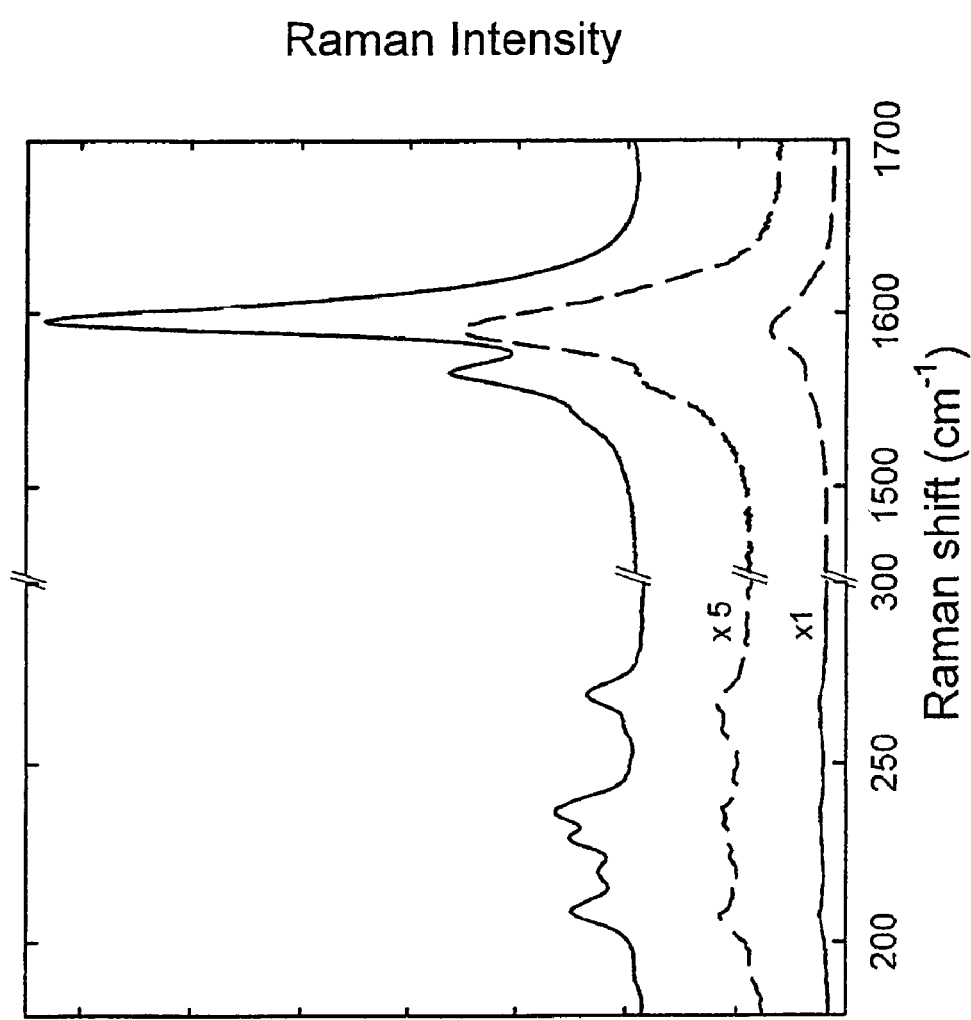
FIG. 7 illustrates the Raman features of separated portions of a HiPco-SWNT sample following separation according to one embodiment of the presently disclosed process.

The process described above in Example 1 was performed on a HiPco SWNT sample purchased from Rice University. FIG. 7 illustrates the Raman features of the recovered-HiPco-SWNT sample (solid line) and the free-HiPco-SWNT sample (broken line) with 785 nm (1.58 eV) excitation. For HiPco SWNT samples prior to processing according to the disclosed invention, the expected absorptions are: $M_{11}$~500-600 nm and $S_{22}$~650-900 nm. Thus, the 785 excitation probes predominantly semiconducting nanotubes. The Raman intensities of the sample enriched in semiconducting nanotubes should therefore be much higher than those of the sample enriched in metallic nanotubes. This is the case, as can be seen in reference to FIG. 7. The recovered-HiPco-SWNT sample has much higher Raman intensities than the free-HiPco-SWNT sample, consistent with the recovered sample being enriched in semiconducting SWNTs and the free sample being enriched in metallic SWNTs. In addition, the G-bands of the two samples were found to be generally similar, with the peak of the metallic free-HiPco-SWNT sample being somewhat broader than the semiconducting recovered-HiPco-SWNT sample. This result is comparable with the arc-produced SWNT samples from Example 1.

The separation of HiPco-SWNT was found to be less efficient than that of the arc-produced SWNT samples of Example 1. This is believed to be due to residual iron (or iron ions) from the formation method remaining in the sample that were then available to form a complex with the porphyrin separation agent and reduce the effectiveness of the separation agent/SWNT interactions.

EXAMPLE 3

The separation process described in Example 1 was attempted using Zn-THPP (illustrated in FIG. 1 where M=$Zn^{2+}$). No interaction leading to the solubilization of SWNTs was observed. This suggests that the interactions of THPP with semiconducting SWNTs are specific to the porphyrin free base, and hindered upon the chelation of a metal cation, which would destroy the planer geometry and alter the electronic characteristics of the molecule. The negative results with the use of metalloporphyrins also suggest that the selectivity toward semiconducting SWNTs is associated with THPP, not fragments of decomposed THPP, because porphyrins with and without the center-chelated metal share similar decomposition patterns.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the invention should not be limited to the description of the preferred versions contained herein.

What is claimed is:

1. A method comprising:
   combining a sample including semiconducting single-walled carbon nanotubes and metallic single-walled carbon nanotubes with a separation agent, the separation agent comprising a geometrically planar portion and one or more $\pi$ electrons on the planar portion, the separation agent being soluble in a solvent and the metallic single-walled carbon nanotubes being insoluble in the solvent;
   selectively associating the separation agent with the semiconducting single-walled carbon nanotubes in the sample to form a complex including the semiconducting single-walled carbon nanotubes associated with the separation agent;
   combining the solvent with the complex to form a mixture; and
   selectively solubilizing the complex with the solvent; wherein
   the mixture comprises the solubilized complex and solids, the solids including the metallic single-walled carbon nanotubes.

2. The method according to claim 1, further comprising separating and collecting the solids from the mixture.

3. The method according to claim 2, further comprising repeating the method, wherein the collected solids are utilized as the sample during the repetition of the method.

4. The method according to claim 3, wherein the solids collected following the repetition of the method comprise at least about 90% metallic single-walled nanotubes.

5. The method according to claim 1, wherein the separation agent is a planar hydrocarbon.

6. The method according to claim 5, wherein the separation agent is a porphyrin.

7. The method according to claim 5, wherein the separation agent is a pyrene.

8. The method according to claim 5, wherein the separation agent is a polybenzenoid hydrocarbon.

9. The method according to claim 1, wherein the separation agent further comprises one or more hydrocarbon chains.

10. The method according to claim 9, wherein the one or more hydrocarbon chains are about 16 or more carbons in length.

11. The method according to claim 1, wherein the solids comprise at least about 50% by weight metallic single-walled nanotubes.

12. The method according to claim 1, further comprising collecting liquid of the mixture, the liquid comprising the solubilized complex.

13. The method according to claim 12 further comprising reversing the association between the separation agent and the semiconducting single-walled nanotubes such that the semiconducting single-walled nanotubes come out of solution.

14. The method according to claim 13, further comprising collecting the insoluble semiconducting single-walled nanotubes.

15. The method according to claim 13, wherein the association between the separation agent and the semiconducting single-walled nanotubes is reversed by washing the complex in an acid.

16. The method according to claim 13, wherein the association between the separation agent and the semiconducting single-walled nanotubes is reversed by annealing the complex.

17. The method according to claim 1, wherein the sample is preprocessed.

18. A method comprising:
    combining a sample including semiconducting single-walled carbon nanotubes and metallic single-walled carbon nanotubes with a free base porphyrin comprising one or more hydrocarbon chains;
    selectively associating the porphyrin with the semiconducting single-walled carbon nanotubes to form a complex including the semiconducting single-walled carbon nanotubes associated with the porphyrin;
    combining an organic solvent with the complex to form a mixture, the free base porphyrin being soluble in the organic solvent and the metallic single-walled carbon nanotubes being insoluble in the solvent; and
    selectively solubilizing the complex with the organic solvent; wherein
    the mixture comprises the solubilized complex and solids, the solids comprising the insoluble metallic single-walled carbon nanotubes.

19. The method according to claim 18, further comprising separating and collecting the solids from the mixture.

20. The method according to claim 19, further comprising repeating the method, wherein the collected solids are utilized as the sample during the repetition of the method.

21. The method according to claim 18, wherein the ratio of metallic single-walled nanotubes to semiconducting single-walled nanotubes in the solids is at least about 1.5 times the ratio of metallic single-walled nanotubes to semiconducting single-walled nanotubes in the sample.

22. The method according to claim 18, further comprising collecting liquid of the mixture, the liquid comprising the solubilized complex.

23. The method according to claim 22 further comprising reversing the association between the separation agent and the semiconducting single-walled nanotubes to form a solid residue comprising the semiconducting single-walled nanotubes.

24. The method according to claim 23, wherein the solid residue comprises at least about 90% by weight semiconducting single-walled nanotubes.

25. The method according to claim 18, wherein the separation agent is 5, 10, 15, 20-tetrakis(hexadecylosyphenyl)21H, 23H-porphine.

* * * * *